(12) United States Patent
Bruckert

(10) Patent No.: US 10,118,056 B2
(45) Date of Patent: Nov. 6, 2018

(54) BREATHING ASSEMBLY FOR AIRCRAFT

(75) Inventor: Sebastien Bruckert, Auxonne (FR)

(73) Assignee: Zodiac Aerotechnics, Plaisir (FR)

( * ) Notice: Subject to any disclaimer, the term of this patent is extended or adjusted under 35 U.S.C. 154(b) by 1001 days.

(21) Appl. No.: 13/522,027

(22) PCT Filed: Jan. 22, 2010

(86) PCT No.: PCT/IB2010/000607
§ 371 (c)(1),
(2), (4) Date: Jul. 13, 2012

(87) PCT Pub. No.: WO2011/089463
PCT Pub. Date: Jul. 28, 2011

(65) Prior Publication Data
US 2012/0325216 A1      Dec. 27, 2012

(51) Int. Cl.
*A62B 18/10*      (2006.01)
*A62B 9/02*      (2006.01)
(Continued)

(52) U.S. Cl.
CPC .............. *A62B 18/084* (2013.01); *A62B 9/02* (2013.01); *A62B 18/10* (2013.01); *A62B 25/00* (2013.01);
(Continued)

(58) Field of Classification Search
CPC ........... A62B 18/10; A62B 9/02; A62B 25/00; B64D 10/00; B64D 2231/025
(Continued)

(56) References Cited

U.S. PATENT DOCUMENTS 3,073,301 A    1/1963   Hay et al.
4,002,167 A    1/1977   Rambosek
(Continued)

FOREIGN PATENT DOCUMENTS

CN    1192162 A    9/1998
EP    1433502      6/2004
(Continued)

OTHER PUBLICATIONS

International Search Report dated Apr. 4, 2008 in Application No. PCT/IB2007/053438.
(Continued)

*Primary Examiner* — Justine Yu
*Assistant Examiner* — Douglas Sul
(74) *Attorney, Agent, or Firm* — Kilpatrick Townsend & Stockton LLP; Dean W. Russell

(57) ABSTRACT

There is provided a breathing assembly for an aircraft that includes a breathing mask to be connected to a source of breathing gas. The assembly also includes a stowage box forming a receptacle for receiving the breathing mask in a stowage position, and a valve assembly comprising a valve having an open position in which the valve allows the feed of breathing gas to the breathing mask and a closed position in which the valve prevents the feed of breathing gas to the breathing mask, the valve assembly being supported by the breathing mask. There may also be provided a retaining element connected to the stowage box and cooperating with the valve assembly to maintain the valve in the closed position when the breathing mask is in the stowage position.

6 Claims, 3 Drawing Sheets

(51) Int. Cl.
*A62B 25/00* (2006.01)
*A62B 18/08* (2006.01)
*B64D 10/00* (2006.01)

(52) U.S. Cl.
CPC ........ B64D 10/00 (2013.01); *B64D 2231/025* (2013.01)

(58) Field of Classification Search
USPC ............ 128/205.24, 206.27, 207.12; 137/90, 137/377, 387, 382; 251/89, 90, 91, 92, 251/128, 291, 95
See application file for complete search history.

(56) References Cited

U.S. PATENT DOCUMENTS

| | | | |
|---|---|---|---|
| 4,561,544 A | 12/1985 | Reeve | |
| 4,625,721 A | 12/1986 | Levine et al. | |
| 4,735,002 A | 4/1988 | Rath | |
| 4,915,106 A | 4/1990 | Aulgur et al. | |
| 5,036,846 A | 8/1991 | Aulger et al. | |
| 5,503,147 A * | 4/1996 | Bertheau | 128/207.11 |
| 5,704,073 A | 1/1998 | Sword et al. | |
| 5,941,245 A * | 8/1999 | Hannah et al. | 128/207.11 |
| 5,954,052 A | 9/1999 | McDonald et al. | |
| 6,026,590 A | 2/2000 | Picozza et al. | |
| 6,470,887 B1 | 10/2002 | Martinez | |
| 6,755,194 B2 | 6/2004 | Taieb | |
| 6,923,183 B2 | 8/2005 | Martinez et al. | |
| 6,994,086 B1 | 2/2006 | Martinez et al. | |
| 7,047,972 B2 | 5/2006 | Ging et al. | |
| 7,836,886 B2 * | 11/2010 | McDonald et al. | 128/205.25 |
| 8,863,744 B2 | 10/2014 | Bachelard et al. | |
| 2002/0189617 A1 * | 12/2002 | Cordero et al. | 128/205.25 |
| 2004/0144384 A1 | 7/2004 | Martinez | |
| 2010/0288281 A1 | 11/2010 | Bachelard et al. | |

FOREIGN PATENT DOCUMENTS

| | | |
|---|---|---|
| WO | 2002100487 | 12/2002 |
| WO | 2009007794 A1 | 1/2009 |

OTHER PUBLICATIONS

U.S. Appl. No. 12/667,935, Non-Final Office Action, dated Jul. 13, 2012, 9 pages.
U.S. Appl. No. 12/667,935, Final Office Action, dated Mar. 28, 2013, 12 pages.
U.S. Appl. No. 12/667,935, Non-Final Office Action, dated Sep. 30, 2013, 13 pages.
U.S. Appl. No. 12/667,935, Notice of Allowance, dated Jun. 23, 2014, 10 pages.
International Patent Application No. PCT/IB2010/000607, Written Opinion, dated Oct. 19, 2010, 4 pages.
International Patent Application No. PCT/IB2010/000607, International Preliminary Report on Patentability, dated Aug. 2, 2012, 5 pages.
International Search Report dated Oct. 19, 2010 in Application No. PCT/IB2010/000607.

* cited by examiner

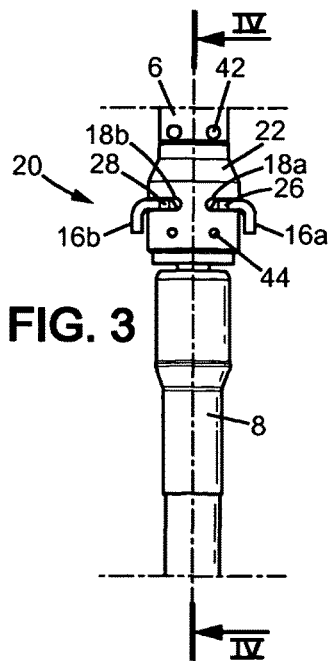
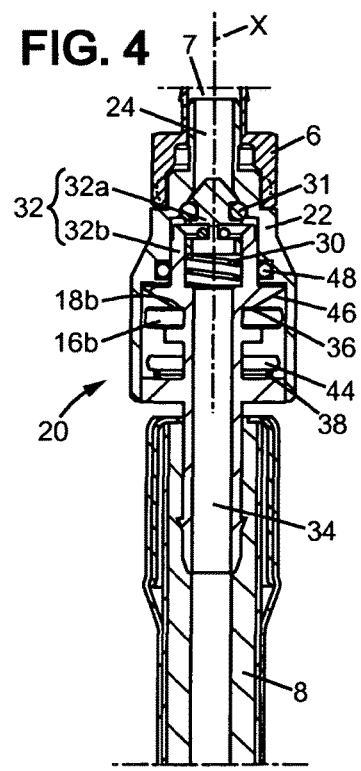
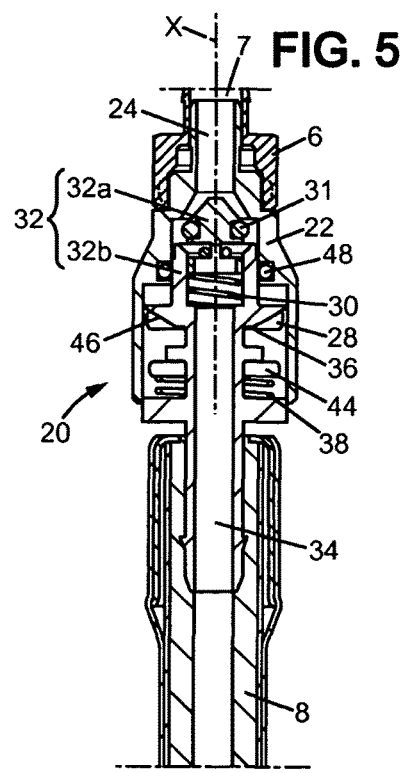

BREATHING ASSEMBLY FOR AIRCRAFT

CROSS REFERENCE TO RELATED APPLICATION

This application is the U.S. national phase of International Application No. PCT/IB2010/000607 filed on Jan. 22, 2012, and published in English on Jul. 28, 2011 as International Publication No. WO2011/089463 A1, the entire contents of which are incorporated herein by reference.

FIELD OF THE INVENTION

The invention relates to the field of breathing assembly for aircraft.

BACKGROUND OF THE INVENTION

In order to ensure the safety of the passengers and crewmembers of an aircraft, in case of pressurization failure, the occurrence of smoke or other trouble affecting the gas contained in the air, aviation regulations require on board airliners a safety oxygen supply circuit able to supply passengers and crewmembers with an oxygen enrichment function of the aircraft altitude.

It is already known, in particular from WO-2009/007794, a breathing assembly for aircraft comprising:
- a breathing mask to be connected to a source of breathing gas,
- a stowage box forming a receptacle for receiving the breathing mask in a stowage position, said stowage box having an opening for extracting the breathing mask from the stowage box, and
- a valve assembly comprising a valve having an open position in which the valve allows the feed of breathing gas to the breathing mask and a closed position in which the valve prevents the feed of breathing gas to the breathing mask, the valve being automatically positioned in the open position when the breathing mask is extracted from the stowage box.

After a pressurization failure or appearance of smoke, the crewmembers and in particular the pilot must extract the breathing mask from the stowage box and don it upon their face to be fed with oxygen. The breathing mask must be donned quickly, since oxygen lacks at high altitude (hypoxia) or toxic smoke may alter the abilities of the crewmembers to proceed with any emergency measures that could ensure the safety of the passengers. To this aim, thanks to the valve assembly, the breathable gas is not allowed to feed the breathing mask when the breathing mask is in the stowage box but the breathable gas is automatically allowed to feed the breathing mask when the breathing mask is used.

The breathing assembly disclosed in WO-2009/007794 avoids feeding the breathing mask when stored. Indeed, previously the breathing assembly was deprived of a valve assembly and the mask regulator was constantly pressurised.

SUMMARY OF THE INVENTION

The invention aims at providing a breathing assembly which allows not to feed the breathing mask when the breathing mask is stored and is simpler, more convenient to use and less expensive.

According to the invention, the valve assembly is supported by the breathing mask and the breathing assembly further comprises a retaining element which is connected to the stowage box and cooperates with the valve assembly to maintain the valve in the closed position when the breathing mask is in the stowage position.

In WO-2009/007794, a first feeding duct connecting the source of breathing gas to stowage box and a second feeding duct connecting the stowage box to the breathing mask were required. According to the invention, the breathing mask has no more to be connected to the stowage box by a feeding duct when the breathing mask is donned by the user. Therefore, the length of duct required can be reduced and the breathing assembly is less cumbersome.

According to another feature in accordance with the invention, the valve assembly preferably comprises a casing directly connected to the breathing mask.

Therefore, only one duct is required for connecting the breathing mask with the source of breathing gas.

According to a supplementary feature in accordance with the invention, the casing of the valve assembly is removably connected to the breathing mask.

Therefore, the breathing mask can be removed while preventing leaks of breathing gas.

According to the invention, the breathing assembly preferably has the supplementary features:
- the breathing mask further comprises a pneumatic regulator adapted to regulate an oxygen flow rate function of the surrounding pressure, and
- the breathing assembly further comprises a feeding duct directly connected to the valve assembly, the valve assembly being interposed between the feeding duct and the pneumatic regulator.

In advantageous embodiments, the breathing assembly preferably further has one or more of the following features:
- the valve assembly comprises a casing in which the valve slides along a sliding direction between the open position and the closed position, the casing has a slot and, in the stowage position, the retaining element is inserted in the slot and the valve abuts an abutment surface of the retaining element extending perpendicularly to the sliding direction;
- the retaining element has a fork form;
- the casing has a first slot and a second slot opposed to the first slot, the end portion of the retaining element comprises a first branch and a second branch and, in the stowage position, the first branch of the retaining element is inserted in the first slot, the second branch of the retaining element is inserted in the second slot and the valve abuts both first and second branches of the retaining element;
- the casing comprises an inner passage, the valve comprises a stem portion and a head portion, the stem portion comprises an inner duct which is sealingly connected to the inner passage of the casing and an external shoulder abutting the abutment surface of the retaining element when the breathing mask is in the stowage position, and the head portion is mounted on the stem portion and closes the inner passage of the casing when the valve is in the closing position;
- the head portion is elastically mounted on the stem portion;
- the valve assembly further comprises a spring connecting the head portion and the stem portion;
- the retaining element is preferably fixed on the stowage box.

BRIEF DESCRIPTION OF THE DRAWINGS

Other features and advantages of the present invention will appear in the following detailed description, with reference to the appended drawings in which:

FIG. 3 represents, at increased scale, a part of the breathing assembly in the direction of the arrow referenced III in FIG. 1, FIG. 4 represents partially the breathing assembly in section on the plane referenced IV-IV in FIG. 3, FIG. 5 represents partially the breathing assembly in accordance with FIG. 4, in the use position.

DETAILED DESCRIPTION OF AN EMBODIMENT OF THE INVENTION

Figure 1:
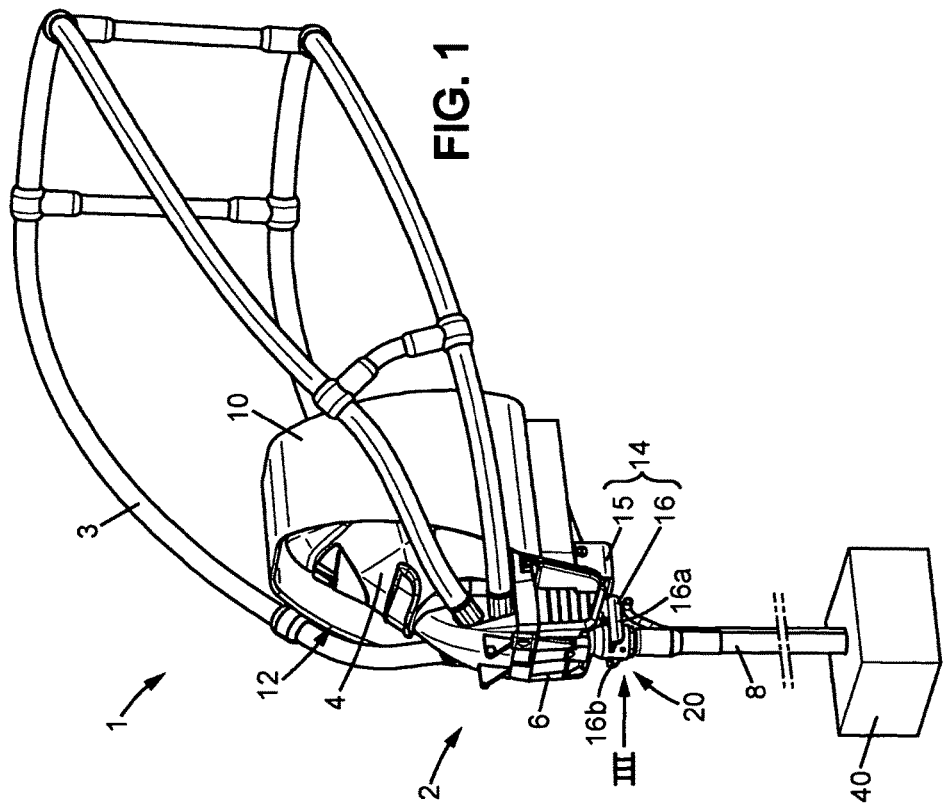
FIG. 1 represents in perspective a breathing assembly according to the invention, in a stowage position.

FIGS. 1 to 5 illustrate a breathing assembly 1 comprising in particular a breathing mask 2, a stowage box 10, a retaining element 14, a valve assembly 20 and a feeding duct 8 which is supple and in fluid communication with a source of breathing gas 40.

Figure 2:
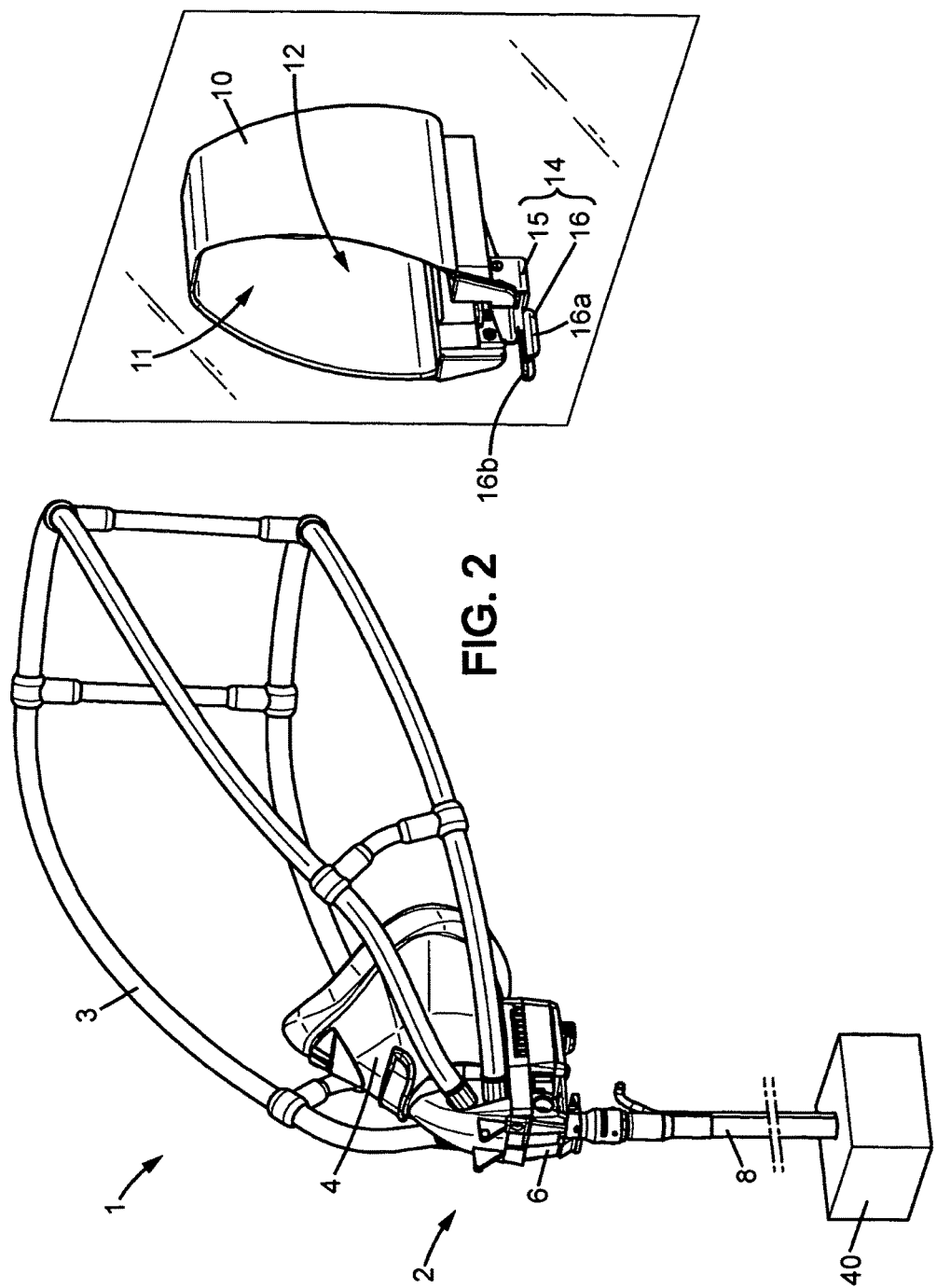
FIG. 2 represents the breathing assembly in accordance with FIG. 1, in a use position.

The breathing mask 2 is of known type. As shown in FIGS. 1 and 2, the breathing mask 2 comprises an oronasal face piece 4, a harness 3 and a pneumatic regulator 6. Each of the harness 3 and the pneumatic regulator 6 are connected to the oronasal face piece 4. The oronasal face piece 4 is flexible to be sealingly applied over the bottom of a user's face. The harness 3 is elastic to clamp the oronasal face piece 4 on the user's face. The pneumatic regulator 6 comprises a rigid casing and is intended to regulate the pressure of the breathing gas fed to the user. The oronasal face piece 4 is fed in breathing gas from the source of breathing gas 40 through successively the feeding duct 8, the valve assembly 20 and the pneumatic regulator 6.

The stowage box 10 comprises a bottom wall and peripheral side walls defining a receptacle 11. The bottom wall is substantially flat and intended to be fixed on a wall of an airplane cabin. The receptacle 11 receives the oronasal face piece 4 of the breathing mask 2 when the breathing mask 2 in the stowage position shown in FIG. 1. The stowage box 10 has an opening 12 for extracting the oronasal face piece 4 of the breathing mask 2 from the receptacle 11.

As shown in particular in FIGS. 3 to 5, the valve assembly 20 mainly comprises a casing 22 and a valve 32. The valve assembly 20 is directly and rigidly mounted on the bottom of the pneumatic regulator 6, a protruding end of the casing 22 being inserted in a duct 7 of the pneumatic regulator. The casing 22 has a housing in which the valve is disposed. The housing defines an inner passage in fluid communication with duct 7 of the pneumatic regulator 6. The valve 32 is sealingly connected to the housing of the casing 22 thanks to an O-ring 48.

The valve 32 comprises a head portion 32a and a stem portion 32b. The stem portion 32b of the valve has an inner duct 34, extending along a sliding direction X, in fluid communication with the feeding duct 8 and the inner passage 24 of the casing 22.

The valve 32 is movable along the sliding direction X between an open position shown in FIG. 4 and a closed position shown in FIG. 5. When the valve 32 is in the closed position the head portion 32a of the valve 32 abuts the casing 22 through a O-ring 31 and therefore close the inner passage 24 of the casing 22. When the valve 32 is in the open position the head portion 32a of the valve is at a distance from the casing 22. So, the breathing gas may flow through the inner passage 24 of the casing 22. Thus the duct 7 of the pneumatic regulator 6 is in fluid communication with the source of gas 40.

A biasing spring 38 biases the valve 32 to the open position. The biasing spring 38 is optional. Indeed, in an alternative embodiment, the valve assembly 30 could be designed, so that the pressure of the breathing gas biases the valve 32 into the open position.

In order to remove potential troubles due to dimension tolerances, the head portion 32a of the valve 32 is connected to the stem portion 32b of the valve 32 through a spring 30. In an alternative embodiment, the head portion 32a could be rigidly fixed to the stem portion 32b.

The casing 24 is fixed by two first pins 42 to the pneumatic regulator 6. So, the casing may be disconnected from the pneumatic regulator 6, for example for maintenance operation, by removing the first pins 42.

The valve 32 is retained within the housing of the casing 22 by two second pins 44. The valve 42 may be separated from the casing 22 by removing the pins 44.

The casing 22 further has a first slot 26 and a second slot 28 both extending perpendicular to the sliding direction X and parallel one to the other. The first slot 26 and the second slot 28 are radially opposed one to the other. The valve stem 32a has an external shoulder 36 extending radially relative to the sliding direction X. Furthermore, the retaining element 14 comprises a support portion 15 fixed by bolts under the stowage box 10 and an end portion 16 having a fork shape. The end portion 16 comprises a first branch 16a and a second branch 16b parallel one to the other. The first branch 16a and the second branch 16b are adapted to be removably inserted respectively in the first slot 26 and the second slot 28 of the casing 22.

As shown in FIGS. 1, 3 and 4, when the breathing mask 2 is in the stowage position, the first branch 16a of the retaining element 14 is inserted in the first slot 26 and the second branch 16b of the retaining element 14 is inserted in the second slot 28 and, the shoulder 36 abuts a first abutment surface 18a positioned on the first branch 16a and a second abutment surface 18b positioned on the second branch 16b. Therefore, the retaining element 14 prevents the valve 32 from sliding along the sliding direction. So, the valve 32 is retained in the closed position.

In order to ease the insertion of the branches 16a, 16b of the retaining element 14 in the slots 26, 28 and to move the valve 32 from its open position to its closed position against the pressure of the biasing spring 38, the valve 32 has a circumferentially bevelled surface 46 adjacent to the shoulder 36.

Of course, the embodiment described in connection with the figures is illustrative and not limitative. For example, the fixation between the casing 22 and the valve 32 could be conveniently achieved with other means that the pins 44.

The invention claimed is:

1. A breathing assembly for aircraft comprising:
    a breathing mask to be connected to a source of breathing gas,
    a stowage box forming a receptacle for receiving the breathing mask in a stowage position, said stowage box having an opening for extracting the breathing mask from the stowage box, and
    a valve assembly comprising a valve having an open position in which the valve allows the feed of breathing gas to the breathing mask and a closed position in which the valve prevents the feed of breathing gas to the breathing mask, the valve being automatically positioned in the open position when the breathing mask is extracted from the stowage box,
    wherein the valve assembly is supported by the breathing mask and the breathing assembly further comprises a retaining element which is connected to the stowage box and cooperates with the valve assembly to maintain the valve in the closed position when the breathing mask is in the stowage position, wherein the valve assembly comprises a casing in which the valve slides along a sliding direction between the open position and the closed position, the casing has at least one slot, and in the stowage position, the retaining element is inserted in the slot and the valve abuts an abutment surface of the retaining element extending perpendicularly to the sliding direction.

2. Breathing assembly according to claim 1 wherein the retaining element has an end portion having a fork form.

3. Breathing assembly according to claim 2 wherein:
the casing has a first slot and a second slot opposed to the first slot,
the end portion of the retaining element comprises a first branch and a second branch,
in the stowage position, the first branch of the retaining element is inserted in the first slot, the second branch of the retaining element is inserted in the second slot and the valve abuts both first and second branches of the retaining element.

4. Breathing assembly according to claim 2 wherein:
the casing comprises an inner passage,
the valve comprises:
a stem portion comprising an inner duct which is sealingly connected to the inner passage of the casing and an external shoulder abutting the abutment surface of the retaining element when the breathing mask is in the stowage position, and
a head portion mounted on the stem portion, the head portion closing the inner passage of the casing when the valve is in the closing position.

5. Breathing assembly according to claim 4 wherein the head portion is elastically mounted on the stem portion.

6. Breathing assembly according to claim 5 wherein the valve assembly further comprises a spring connecting the head portion and the stem portion of the valve.

\* \* \* \* \*